United States Patent [19]
Schreifels, Jr. et al.

[11] Patent Number: 5,603,758
[45] Date of Patent: Feb. 18, 1997

[54] COMPOSITION USEFUL FOR LIGHTWEIGHT ROOF TILES AND METHOD OF PRODUCING SAID COMPOSITION

[75] Inventors: Walter A. Schreifels, Jr., Carlsbad; Alfonso V. Alvarez, San Bernadino; Luciano Lopez, Moreno Valley; Joseph E. Smith, Rancho Mirage, all of Calif.

[73] Assignee: Boral Concrete Products, Inc., Newport Beach, Calif.

[21] Appl. No.: 540,293

[22] Filed: Oct. 6, 1995

[51] Int. Cl.$^6$ .................................. C04B 24/00
[52] U.S. Cl. .................. 106/677; 106/672; 106/724; 106/737; 106/738; 106/802; 106/819; 106/823; 264/211; 264/176.1; 264/DIG. 43; 524/650
[58] Field of Search .................. 106/672, 677, 106/696, 724, 737, 738, 802, 817, 819, 823; 264/211, 176.1, DIG. 43; 524/2, 4, 650

[56] References Cited

U.S. PATENT DOCUMENTS

| | | | |
|---|---|---|---|
| 4,043,826 | 8/1977 | Hum | 524/5 |
| 4,229,224 | 10/1980 | Dawson et al. | 106/695 |
| 4,746,365 | 5/1988 | Babcock et al. | 106/695 |
| 5,075,358 | 12/1991 | Riley et al. | 106/802 |
| 5,108,679 | 4/1992 | Rirsch et al. | 106/802 |
| 5,268,028 | 12/1993 | Fifield | 106/823 |
| 5,362,320 | 11/1994 | Whatcott | 106/724 |
| 5,395,442 | 3/1995 | Dunton et al. | 106/724 |
| 5,482,550 | 1/1996 | Strait | 106/677 |

FOREIGN PATENT DOCUMENTS 2526014  5/1982  France.

*Primary Examiner*—Mark L. Bell
*Assistant Examiner*—Michael Marcheschi
*Attorney, Agent, or Firm*—Robbins, Berliner & Carson, LLP

[57] ABSTRACT

Compositions useful for making lightweight roof tiles. The compositions comprise in percent by weight: between about 2.0 to 4.1 latex (solids basis), between about 20.0 to 28.0 cement, between about 28.0 to 55.0 lightweight aggregate, between about 9.0 to 15.0 water, between about 5.0 to 35.0 standard weight aggregate such as sand, between about 0.0 to 8.0 filler such as limestone, and between 0.0 to 1.5 accelerating additive such as calcium chloride. Methods for making the compositions e.g. into lightweight roof tiles, are also disclosed.

24 Claims, No Drawings

COMPOSITION USEFUL FOR LIGHTWEIGHT ROOF TILES AND METHOD OF PRODUCING SAID COMPOSITION

TECHNICAL FIELD OF THE INVENTION

This invention relates to compositions and methods useful for making lightweight roof tiles. The preferred lightweight roof tiles meet the standards of the United States Uniform Building Code (U.B.C.) for Roof Coverings, U.B.C. Standard No. 32-12, for Roofing Tile.

BACKGROUND OF THE INVENTION

Methods to produce roof tiles using cement, sand and water, are well known. U.S. Pat. No. 4,673,659 teaches a method of mixing cement, sand and water, extruding the mix by the well-known roller and slipper method, cutting the extruded mix to provide sections of the required length and curing at elevated temperatures under conditions of high humidity. Roof tiles of essentially flat or convoluted constructions are made in this way. Typically, they have densities ranging from 2.1–2.2 g/cc. Typical U.S. interlocking roof tiles have dimensions of about 422 mm (length)×333 mm (width)×11.5 to 12.5 mm (thickness). Such tiles usually weigh 4.2 to 5.0 kg/tile, with strengthening ribs, nibs and weatherchecks, which are provided on the undersides of the concrete interlocking roof tiles. Conventional concrete roof tiles of the kind described above provide a satisfactory and highly durable roofing material and are extensively used for the roofing of new houses and other buildings with sufficient supports. However, conventional concrete roof tiles are heavy and cannot replace lighter weight roofing materials such as wood shingles and shakes, asphalt shingles, slates, etc., because the building structure cannot support the additional load. For example, with timber framed buildings, it is often necessary to reinforce the existing roof timbers to ensure that they will bear the additional load. This is costly and time consuming, and often leads to abandoning the use of concrete roof tiles for re-roofing work.

Thus, there is continuous need for concrete roof tiles which are lighter in weight than conventional concrete roof tiles but have the adequate strength and durability of conventional concrete roof tiles. Such strong, durable lightweight concrete roof tiles will be useful as a suitable replacement for wood shingles and shakes, asphalt shingles, asbestos cement roofings, slates, etc.

U.S. Pat. No. 5,395,442 to Dunton, et al., (hereinafter referred to as "Dunton, et al.") discloses lightweight concrete roof tiles using latex. Dunton, et al.'s composition consists essentially of: 45–65 parts by weight of an acrylic latex emulsion; 130–180 parts by weight of a cement; 360–400 parts by weight of a lightweight aggregate; and 50–75 parts by weight of additional water.

SUMMARY OF THE INVENTION

The present invention presents compositions useful for making roof tiles which are light, fire resistant, durable, strong, and easy to make. The compositions comprise in percent by weight: between about 2.0 to 4.1 latex (solids basis), between about 20.0 to 28.0 cement, between about 28.0 to 55.0 lightweight aggregate, between about 9.0 to 15.0 water, between about 5.0 to 35.0 standard weight aggregate such as sand, between about 0.0 to 8.0 filler such as limestone, and between about 0.0 to 1.5 accelerating additive such as calcium chloride ($CaCl_2$). The respective ranges of these values are presented below in Table 1.

TABLE 1

| INGREDIENTS | WEIGHT % | WEIGHT % |
| --- | --- | --- |
| LATEX (solids basis) | 2.0 | 4.1 |
| CEMENT | 20.0 | 28.0 |
| LIGHTWEIGHT AGGREGATE | 28.0 | 55.0 |
| WATER | 9.0 | 15.0 |
| STANDARD WEIGHT AGGREGATE SUCH AS SAND | 5.0 | 35.0 |
| FILLER SUCH AS LIMESTONE | 0.0 | 8.0 |
| ACCELERATING ADDITIVES (e.g. $CaCl_2$) | 0.0 | 1.5 |

The present invention also presents a method for making the above compositions, which allows for easy extrusion, casting, or pressing of the composition into the desired products, such as roof tiles, shingles, bricks, and in block and panel shapes.

The preferred method comprises the steps of:

(a) Adding between about 9.0 and 15.0 weight % water to between about 5.0 and 35.0 weight % standard weight aggregate such as sand, followed by adding between about 28.0 and 55.0 weight % lightweight aggregate, between about 0.0 and 8.0 weight % filler such as limestone, between about 2.0 and 4.1 weight % latex (solids basis) each in a mixer to disperse the latex for about 30 seconds; and (b) Then adding between about 20.0 and 28.0 weight % cement and between about 0.0 and 1.5 weight % accelerating additive such as calcium chloride to the mixer for a final mixing time of about 90 seconds to 100 seconds to produce a homogeneous mix.

The present invention also presents products, such as lightweight roof tiles, made from the above compositions and/or methods.

DETAILED DESCRIPTION OF THE INVENTION

As used herein, the term "lightweight roof tile(s)" means a roof tile with a specific gravity of about 1.06 to 1.38. Thus, for a lightweight roof tile of conventional dimensions with a volume of about 2.163 liters, it will weigh about 2.727 kg. The term "water absorption test" means the water absorption test conducted according to the U.B.C. Standard No. 15-5, § 15.506.2 test procedure. The term "water permeability test" refers to the methods and conditions of acceptance outlined in the International Conference of Building Officials (I.C.B.O.) acceptance criteria for special roof systems. The strength test in this application is conducted according to U.B.C. Standard No. 15-5, § 15.506.1 test procedure.

It has been found that, surprisingly, while requiring less latex than those in the prior art, a composition containing the specific latex/cement/lightweight aggregate/standard weight aggregate/filler/water ratio of the present invention still provides a lightweight roof tile of equivalent strength and durability as in the prior art. The filler is a fine particle aggregate, generally in the range of minus 100 mesh to minus 200 mesh size and preferably of low density. An example of such a filler is crushed limestone. Additives such as accelerators, retarders, plasticisors, etc. known in the art may also be employed within their manufacturers recommended concentrations. Calcium chloride ($CaCl_2$) is an example of an accelerating additive.

In its preferred embodiments, the present invention utilizes less latex than was claimed in Dunton, et al., as much as by 40% when the following Example 1 composition is compared to Dunton, et al.'s preferred composition. The applicants found that by using less latex in combination with a more appropriately engineered aggregate combinations of lightweight aggregate, standard weight aggregate and a crushed limestone filler, surprisingly, the compositions of the present invention do not suffer from the defects found in the composition of the prior art, such as: failure to consistently meet the permeability tests of I.C.B.O., and failure to run consistently and controllably through the extrusion process because of sudden and extreme wet or dry mix conditions.

Further, unlike Dunton, et al., the present invention additionally employs standard weight aggregate, preferably in combination with limestone as a fine particle filler. The added sand and limestone minimize the effects of water absorption attributable to the lightweight aggregate. These ingredients also serve to optimize aggregate particle packing and promote improved uniformity of cement hydration. The consequence of these differences from Dunton, et al. are compositions that are infinitely more easily extruded into products that consistently meet or exceed I.C.B.O. test requirements.

The combination of the different ingredients in the recited ranges has the combined effect of allowing the claimed composition to be easily made, without being too wet or too dry during an extrusion process, and providing a tile that meets the strength and permeability tests of:

U.B.C. 1994 Standard No. 15.506.1, Strength Test (300 pounds of minimum breaking strength is required over a maximum unsupported span);

U.B.C. 1994 Standard No. 15.506.2, Water Absorption Test (allowing a maximum absorption of 15% of its' dry weight); and I.C.B.O. July, 1993 Acceptance Criteria For Special Roof Systems, AC07-4.6, Water Permeability Test (after 24 hours of exposure under 2 inches of water head there shall be no indication that water has dripped from the underside of the tile).

The resulting compositions are particularly effective for the preparation of roof tiles having inhibited wet expansion and which set in a relatively short period of time to form a hard mass of high compressive strength, high abrasion resistance, and high erosion and corrosion resistance. These tiles do not have substantial shrinkage during setting and/or excessive dry hardened volume changes, but still possess a high degree of impermeability to fluids.

Using the composition of the invention, it has thus been possible to produce through usual extrusion methods, roof tiles having densities of from about 1.35 to about 1.50 g/cc, preferably about 1.40 g/cc, and having a weight per tile as low as about 2.6 kg. Such tiles weigh only about 55% of the weight of conventional concrete roof tiles, they possess comparable breaking strength and water permeability. The tiles in accordance with the present invention preferably have a minimum thickness of from about 9 to about 12 mm, particularly about 10 to about 11 mm.

Significant cost advantage is gained over the prior art as a consequence of the minimal use of latex and lightweight aggregate. As an added advantage Freeze/Thaw resistance has been demonstrated to meet the requirements of the American Society for Testing and Materials, ASTM C-67 standard (50 cycles).

The term "latex" as used herein includes polymer latex emulsions and compounds which are intended to include those latex emulsions and compounds normally understood in the art to be styrene butadiene, styrene acrylate, acrylic, polyvinyl acetate (PVA), and other latex emulsions, compounds and powders. Usually, latexes contain between 45 to 48% by weight of water. In the composition of the present invention, unless otherwise noted, the percent by weight of the latex is calculated on a dry solids basis and the amount of water normally found in latexes is stated as a portion of the percent by weight of water.

Examples of polymer latex emulsions which are suitable for use in the present invention include methyl cellulose, hydroxyethyl cellulose, polyvinyl alcohol, styrene, divinyl styrene, methyl methacrylate, copolymers of styrene and methyl methacrylate or maleic anhydride, acrylic and acrylic ester resins, emulsions of vinyl acetate homopolymer, vinyl acetate-acrylic copolymer, internally plasticized and externally plasticized vinyl chloride copolymers, polyacrylic emulsions, styrene-butadiene copolymers, vinyl chloride-vinylidene chloride copolymers, vinyl chloride-vinylidene chloride-acrylic terpolymers, copolymers of methyl methacrylate with methacrylic acid, acrylic acid, crotonic acid, itaconic acid or similar unsaturated carboxylic acids; copolymers of methyl methacrylate with ethyl acrylate, 2 ethyl hexyl acrylate, butyl acrylate or similar esters of acrylic acid, together with acids of the above type; copolymers of vinyl acetate with esters of acrylic acid methacrylic acid crotonic acid or similar unsaturated acid, subsequently modified to produce carboxyl groups; copolymers of vinyl acetate with acrylic acid, methacrylic acid, crotonic acid and similar unsaturated acids or salts of these acids; copolymers of vinyl pyrrolidone with acrylic acid, methacrylic acid, crotonic acid or similar unsaturated acid, and which can also include as monomers esters of these acids; copolymers of anhydrides of unsaturated acids, such as maleic acid, with suitable unsaturated monomers such as styrene, di-isobutylene, methyl vinyl ether; partially hydrolysed polymers and copolymers of acrylamide, methacrylamide and acrylonitrile; graft copolymers of polyethylene oxide with copolymers of acrylic acid, methacrylic acid, etc., and methylacrylate, methyl methacrylate.

Other suitable polymers and specific examples of commercially available polymers are disclosed in U.S. Pat. No. 4,229,224, the content of which is expressly incorporated herein by reference.

The polymer latex emulsions used in the present invention are a colloidal dispersion of plastic particles in water. The particles are generally stabilized by a surface coating of anionic or nonionic surfactants which prevent or minimize agglomeration with the polyvalent ions that are normally found in cementitious mixtures as well as to prevent coagulation due to high shear forces when the concrete is mixed. Since these surfactants tend to "foam" when agitated, it is advantageous to incorporate antifoaming agents in the concrete to prevent excessive air entrapment.

Illustrative of non-ionic surfactants are, for example: fatty acids esters such as glycerol monostearate, diethyleneglycol laurate, propyleneglycol monostearate, sorbitol monolaurate, and pentacrythritol monostearate, acid derivatives of ethylene oxide products such as the reaction product of ethylene oxide and oleic acid; condensation products of ethylene oxide with alcohols such as steryl alcohol; and condensation products of ethylene oxide with phenols, naphthols, an alkyl phenols such as dy-t-butylphenoxynonaoxyethylene-ethanol. Preferred are the condensation products of ethylene oxide with alkyl phenols.

Illustrative of anionic surfactants are, for example: the alkyl aryl sulfonates such as dodecylbenzene sodium sulfonate; sulfate derivatives of higher fatty alcohols (i.e., alcohols of at least nine carbon atoms and ordinarily not more than seventeen carbon atoms) such as sodium lauryl sulfate; the sulfonated animal and vegetable oils such as sulfonated fish and castor oils; sulfonated acyclic hydrocarbons; and the like. Advantageously the anionic surfactant component of the cement additive of the invention should be a sodium higher alkyl sulfate such as sodium lauryl sulfate and preferably would consist of a mixture of an alkyl aryl sulfonate surfactant and such sodium higher alkyl sulfate.

The preferred latex is an acrylic latex. Acrylic latex of the butyl acrylate, methylacrylate, methacrylic acid polymer is particularly preferred. One such latex is available as UCAR Latex 429 from Union Carbide Corp., Cary, N.C., U.S.A. The UCAR Latex 429 has a 45–47% of solid polymer by weight, with a pH of 9–10, a viscosity of 30–300 cps, a minimum filming temperature of 10° C., weighs 4 kgs/gallon, and a particle size of $0.2\mu$.

The particular latex emulsion used may contain a wide variety of minor materials, such as preservatives, antioxidants, stabilizers, anti-foaming agents, dispersing agents, thickeners, accelerators and fillers. These are conventional ingredients added in small amounts to commercial lattices. Their presence or absence does not ordinarily affect the process of this invention nor the products produced thereby. They ordinarily function solely to maintain the desirable properties of the latex prior to the latter's incorporation into the products of this invention.

The standard weight aggregate employed may be any naturally occurring mineral aggregate such as sand, conventionally used manufactured aggregate, slag waste, other byproduct or equivalent assemblage of these. Standard weight aggregate generally means particles in the range of 0.05 mm to 6.0 mm, having a bulk density in the range of 75 lb/cf to 90 lb/cf compared to a range of bulk density for lightweight aggregate of 45 pcf to 55 pcf in a similar range of particle size.

The "lightweight aggregates" used herein include naturally occurring materials such as pumice and scoria. Also included are materials produced by manufacturing processes such as sintered pulverized fly ash and expanded materials such as expanded shale, clay, slate, vermiculite and perlite and various blends thereof. The preferred expanded shale material used in accordance with the present invention has a particle size of less than 4.75 mm, and advantageously has a particle size distribution compatible with that of the sand used in conventional mixes for the production of concrete roof tiles by extrusion. Expanded shale aggregate meeting these requirements having a particle size of less than about 3.35 mm is particularly preferred and one such material having a suitable particle size distribution is that available as RIDGELITE No. 3 from Lightweight Processing Co. of Glendale, Calif., U.S.A. This material has a specific weight of 0.80–0.90 weighing 40–60 lbs/ft³.

To create the most preferred lightweight aggregate, the expanded shale is screened to create a material having the following sieve analysis expressed in percent passing weight:

| SIEVE NO. | RIDGELITE NO.3 SAND |
| --- | --- |
| No. 4 | 100 |
| No. 8 | 95–100 |
| No. 16 | 62–78 |
| No. 30 | 40–56 |
| No. 50 | 22–32 |
| No. 100 | 13–21 |
| No. 200 | 6–14 |

Other lightweight aggregate materials may be used instead of the expanded shale, dependent however upon the availability of appropriate grades of such materials. Another preferred material is UTELITE, supplied by the UTE-LITE Corporation of Utah U.S.A., which is an expanded shale comprising shale, quartz and amorphous silicon in excess of 1%.

The cement which can be used in accordance with the invention is Portland cement, especially Type I and Type II Portland cements. Especially preferred are Portland cements meeting the requirement for Type I Portland Cement, ASTM designation C-150. In addition to Portland cement, other known cements can be used. For example, aluminous cement, natural cement, oxychloride cement, magnesia cement and gypsum cements can be used as long as they give the desirable specific gravity of the lightweight roof tile produced.

The compositions, in percent by weight, useful for making the lightweight roof tiles comprises:

between about 2.0 to 4.1 latex (solids basis);

between about 20.0 to 28.0 cement;

between about 28.0 to 55.0 lightweight aggregate;

between about 9.0 to 15.0 water;

between about 5.0 to 35.0 standard weight aggregate;

between about 0.0 to 8.0 filler such as limestone; and between about 0.0 to 1.5 accelerating additive such as $CaCl_2$.

More preferably, the compositions useful for fabricating lightweight concrete roof tiles comprises:

between about 2.2 to 3.0 latex (solids basis);

between about 23.0 to 26.0 cement;

between about 35.0 to 45.0 lightweight aggregate;

between about 10.0 to 12.0 water;

between about 10.0 to 20.0 standard weight aggregate;

between about 3.0 to 7.0 filler such as limestone; and between about 0.0 to 0.6 accelerating additive such as $CaCl_2$.

The most preferred composition is that disclosed in Table 2 of "EXAMPLE 1" below and the composition containing components of Table 2 in about the same percent by weight.

It is hereby noted that in all the above compositions, the percent by weight of the accelerating additive may be varied according to the specific accelerating additive used and its effective range, which is known in the art or can be arrived at without undue experimentation. Accordingly, an effective amount of the accelerating additive is used. Further the accelerating additive accelerates the reaction, and therefore need not be used if one can wait for the reaction to occur in due course. Thus, the above listed ranges for accelerated additive are only exemplary. The other components and their percent weights thus, may be read together with or without the ranges listed for the accelerating additive.

Besides the above essential ingredients, the lightweight roof tile composition also may include, in particular applications, foaming agents or defoaming agents which comprises various anionic, cationic, nonionic and other surface active compounds. The amount of such surface active agents added to the roof tile composition will typically be in the range of from about 0.1 to about 3 percent by weight of cement. Generally, the selection of such additives will be within the skill of those knowledgeable in cement and roof tile technology. Additional admixtures such as retarders, accelerators, surfactants, defoamers, water reducing agents, stearates, waterproofers, fume silica, chemical and physical blowing agents, thixotropes, whiteners, and thickeners may also be added to either the dry tile mix or the emulsion or mixing waters .to produce the desired result.

In addition, to produce a colored roof tile, pigments may be included. Exemplary organic pigments include Benzidine yellow, Lithol Red 4R, Peacock Blue Lake, Aniline Black, PV Violet BL, etc. Exemplary inorganic pigments include oxides of zinc, titanium, iron, cobalt and chromium; zinc white; red iron oxide; cadmium yellow; cadmium red; prussian blue; carbon black; etc.

The most preferred composition for making the lightweight roof tiles is disclosed in the "EXAMPLES" below.

Another aspect of the invention presents a method for making the lightweight tile using the composition of the present invention. An advantage of the present method is that it can be conveniently carried out using conventional equipment and conditions as employed in the well known roller and slipper method. It is critical that the ingredients be mixed in a prescribed sequence, so that existing extruding, pressing or casting machines designed for standard concrete mixes can be used to produce the lightweight roof tiles of the required strength.

The method of the present invention for preparing the lightweight roof tile comprises the steps of:

(a) Adding between about 9.0 and 15.0 weight % water to between about 5.0 and 35.0 weight % standard weight aggregate such as sand, followed by adding between about 28.0 and 55.0 weight % lightweight aggregate, between about 0.0 and 8.0 weight % filler such as limestone, between about 2.0 and 4.1 weight % latex (solids basis) each in a mixer to disperse the latex, the mixing time is about 30 seconds to disperse the latex;

(b) Then adding between about 20.0 and 28.0 weight % cement and between about 0.0 and 1.5 weight % accelerating additive such as calcium chloride to the mixer for a final mixing time of about 90 seconds to 100 seconds to produce a homogeneous mix;

(c) Extruding mixture (b) into a roofing tile; and (d) Curing the roofing tile at about 100°–120° F. and about 80–95% relative humidity for about 4 hours, then for about one additional hour with the relative humidity controller turned off.

The more preferred method for preparing the lightweight roof tile comprises the steps of:

(a) Adding between 10.0 and 12.0 weight % water to between 10.0 and 20.0 weight % standard weight aggregate such as sand, followed by adding between 35.0 and 45.0 weight % lightweight aggregate, between 3.0 and 7.0 weight % filler such as limestone, between 2.2 and 3.0 weight % latex (solids basis) each in a mixer to disperse the latex, the mixing time is about 30 seconds to disperse the latex;

(b) Then adding between 23.0 and 26.0 weight % cement and between 0.0 and 0.6 weight % accelerating additive such as calcium chloride to the mixer for a final mixing time of about 90 seconds to 100 seconds to produce a homogeneous mix;

(c) Extruding mixture (b) into a roofing tile; and (d) Curing the roofing tile at about 100°–120° F. and about 80–95% relative humidity for about 4 hours, then for about one additional hour with the relative humidity controller turned off.

The most preferred method for preparing the lightweight roof tile comprises the steps of:

(a) Adding about 10.9 weight % water to 15.3 weight % standard weight aggregate such as sand, followed by adding about 41.5 weight % lightweight aggregate, about 4.9 weight % filler such as limestone, about 2.4 weight % latex (solids basis) each in a mixer to disperse the latex, the mixing time is about 30 seconds to disperse the latex;

(b) Then adding about 24.4 weight % cement and about 0.6 weight % accelerating additive such as calcium chloride to the mixer for a final mixing time of about 90 seconds to 100 seconds to produce a homogeneous mix;

(c) Extruding mixture (b) into a roofing tile; and (d) Curing the roofing tile at about 100°–120° F. and about 80–95% relative humidity for about 4 hours, then for about one additional hour with the relative humidity controller turned off.

Similar to the compositions of the present invention described previously, in the above methods, the accelerating additive may be varied according to the specific accelerating additive used and its effective range, which is known in the art or can be arrived at without undue experimentation. Accordingly, an effective amount of the accelerating additive is used. Further the accelerating additive accelerates the reaction, and therefore need not be used if one can wait for the reaction to occur in due course. Thus, the above listed ranges for accelerated additive are only exemplary. The other components and their percent weights thus, may be read together with or without the ranges listed for the accelerating additive. Further, the above methods are not limited to making roof tiles or making them by extrusion. Steps (a) and (b) of the above methods can be used to produce lightweight compositions which can be made into different products by the same or different means. Further, steps (c) and (d) are exemplary not to be construed as limiting the methods. For example, one skilled in the art can, without undue experimentation, adjust steps (c) and (d) to make the same or different products by the same or different means, such as by extruding, casting, or pressing the compositions into roof tiles, shingles bricks, and in different shapes. The curing time may similarly be varied depending on the time available.

Other common additives for concrete and lightweight cement products may be added at the appropriate places depending on the end use. For example, accelerators, such as calcium chloride can be utilized. A principal method for forming the lightweight concrete roof tile is by extrusion. In the extrusion method, the forming pressure is about 200 lbs/in$^2$. A carrier pallet creates the shape of the bottom of the tile and a roller and slipper shape the top surface. Curing proceeds on the pallet or pallets which contain(s) the formed tile(s). The top surface of the tile which is shaped by the roller and slipper can be modified to produce any shape from a smooth European tile to a rough, random shape. The bottom surface is shaped by the pallet, and may be hollowed out. Additionally, a shake shingle shape can be extruded.

The second method of forming and shaping employs a standard power or block forming machine. This machine handles the lightweight concrete roof tile composition easily and consistently without modification. Thus, products previously produced using standard heavy concrete mixers can, by using the present mix, be also produced in a lightweight version. The shapes for roof tiles and shake shingles may also be produced on these machines.

The following non-limiting examples further illustrate the present invention.

EXAMPLES

Example 1: Composition of the Present Invention

Lightweight roof tiles were prepared using the above most preferred method by extrusion from the composition indicated in Table 2 below.

side of the specimen to not less than 2 inches above the invert of the main water course. Inverts of the side water channels must not be covered by the sealant. Nail holes are sealed. The specimen was supported in a horizontal position by the metal frame alone. A 2-inch head of water measured from the main water course was maintained on the tile for a period of 24 hours. When necessary, water was added during the test to maintain this level. At the end of 24 hours, there was no indication that water had dripped from the under side of the tile. Until recently, I.C.B.O. permitted by exception, a waiver of the requirement to perform the described test, providing that flexural strengths were demonstrated by test results to be at least 10% greater than the required minimum breaking strength.

Currently, all tile production must be tested for water permeability by the test method described. In the prior art, strength requirements were often adequate to pass water permeability requirements by the strength exception criteria. However, by application of the water permeability test procedure, samples produced under the prior art, routinely failed water permeability test requirements.

The present invention has solved a serious deficiency in water permeability while maintaining or improving other necessary properties of the tile. Improved properties of the present invention, as shown by tests conducted on lightweight roof tiles made from Composition 1, are as follows:

TABLE 3

| SAMPLE # | OVEN DRY WEIGHT (GRAMS) | SATURATED WEIGHT (GRAMS) | % ABSORPTION OF H$_2$O (48 HOURS) | FLEX STRENGTH (POUNDS) | PERMEABILITY OF H$_2$O (24 HOURS) |
|---|---|---|---|---|---|
| 1 | 30 | 914 | 10.12 | 457 | PASS |
| 2 | 1056 | 1164 | 10.23 | 443 | PASS |
| 3 | 953 | 1052 | 10.39 | 490 | PASS |
| 4 | 962 | 1046 | 8.73 | 456 | PASS |
| 5 | 923 | 1007 | 9.10 | 443 | PASS |
| AVERAGE | 944.8 | 1036.6 | 9.714 | 457.8 | PASS |

TABLE 2

| Composition 1 | |
|---|---|
| INGREDIENTS | BY WEIGHT % |
| Latex | 2.4 |
| Cement | 24.4 |
| Lightweight Aggregate | 41.5 |
| Water | 10.9 |
| Standard Weight Aggregate | 15.3 |
| Limestone | 4.9 |
| CaCl$_2$ | 0.6 |
| TOTAL | 100.0 |

After curing, the tiles prepared from Composition 1 were subjected to the strength and water absorption test under U.B.C. Standard No. 15-5 as well as the test for water permeability as required by I.C.B.O.

For the permeability test, three tiles are tested for permeability. Each sample is sealed along the edges with suitable metal frame and putty, mastic or other compound to provide a water-tight seal. The frame extends from below the under- Lightweight roof tiles were prepared using the above most preferred method by extrusion from another compositional increment as indicated in Table 4 below.

TABLE 4

| Composition 2 | |
|---|---|
| INGREDIENTS | WEIGHT % |
| Latex | 2.8 |
| Cement | 20.5 |
| Lightweight Aggregate | 29.7 |
| Water | 11.8 |
| Standard Weight Aggregate | 30.7 |
| Limestone | 4.1 |
| CaCl$_2$ | 0.4 |
| TOTAL | 100.0 |

Similarly, improved properties of the present invention, as shown by tests conducted on lightweight roof tiles made from Composition 2, are as follows:

TABLE 5

| SAMPLE # | OVEN DRY WEIGHT (GRAMS) | SATURATED WEIGHT (GRAMS) | % ABSORPTION OF H₂O (48 HOURS) | FLEX STRENGTH (POUNDS) | PERMEABILITY OF H₂O (24 HOURS) |
|---|---|---|---|---|---|
| 1 | 692 | 733 | 6.0 | 522 | PASS |
| 2 | 546 | 591 | 8.1 | 571 | PASS |
| 3 | 360 | 386 | 7.3 | 582 | PASS |
| 4 | 532 | 566 | 6.3 | 607 | PASS |
| 5 | 499 | 530 | 6.2 | 454 | PASS |
| AVERAGE | 525.9 | 561.2 | 6.78 | 547.2 | PASS |

Example 2: Composition of Prior Art Compared to the Present Invention

It has been found that, by using less latex, surprisingly, the compositions of the present invention achieve the required breaking strengths and water absorptions and do not suffer from defects found in the composition of the prior art as disclosed in Dunton, et al., such as failure to meet the permeability test required by I.C.B.O., or failure to run consistently on the extruder because the composition suddenly became too wet and/or too dry.

The composition of the prior art was made in a manner as described in Dunton, et al. and is shown in Table 6, below.

TABLE 6

| Lightweight Roof Tile Composition | |
|---|---|
| INGREDIENTS | WEIGHT % |
| Latex | 4.7 |
| Cement | 25.0 |
| Lightweight Aggregate | 55.6 |
| Water | 4.7 |
| Standard Weight Aggregate | NONE |
| Limestone | NONE |
| CaCl₂ | NONE |
| TOTAL | 100.0 |

The resulting inferior properties of the roof tiles made from Dunton, et al.'s composition were shown by similar tests, as follows:

TABLE 7

| SAMPLE # | OVEN DRY WEIGHT (GRAMS) | SATURATED WEIGHT (GRAMS) | % ABSORPTION OF H₂O (48 HOURS) | FLEX STRENGTH (POUNDS) | PERMEABILITY OF H₂O (24 HOURS) |
|---|---|---|---|---|---|
| 1 | 1168 | 1275 | 9.12 | 349 | FAIL |
| 2 | 1018 | 1141 | 12.08 | 320 | FAIL |
| 3 | 1045 | 1243 | 19.04 | 322 | FAIL |
| 4 | 1034 | 1151 | 11.35 | 342 | FAIL |
| 5 | 1085 | 1189 | 9.60 | 286 | FAIL |
| AVERAGE | 1070.0 | 1199.8 | 12.238 | 323.8 | FAIL |

The foregoing is meant to illustrate, but not to limit, the scope of the invention. Within the scope of the present claims are other embodiments or modifications which one skilled in the art is capable of making, based on the teachings herein and what is known in the art, without undue experimentation.

We claim:

1. A composition useful for fabricating lightweight roof tiles consisting essentially of, in weight percent:
   between about 2.0 to 4.1 latex on solids basis,
   between about 20.0 to 28.0 cement,
   between about 28.0 to 55.0 lightweight aggregate,
   between about 9.0 to 15.0 water;
   between about 5.0 to 35.0 standard weight aggregate, and
   between about 0.0 to 8.0 filler.

2. The composition of claim 1, further consisting essentially of an effective accelerating amount of accelerating additive.

3. The composition of claim 1, wherein the standard weight aggregate is sand.

4. The composition of claim 3, wherein the filler is limestone.

5. The composition of claim 2, wherein the accelerating additive is calcium chloride, the standard weight aggregate is sand, and the filler is limestone.

6. The composition of claim 1, wherein in weight percent:
   the latex is between about 2.2 to 3.0,
   the cement is between about 23.0 to 26.0,
   the lightweight aggregate is between about 35.0 to 45.0,
   the water is between about 10.0 to 12.0,
   the standard weight aggregate is between about 10.0 to 20.0, and
   the filler is between about 3.0 to 7.0.

7. The composition of claim 6, further consisting essentially of an effective accelerating amount of accelerating additive.

8. The composition of claim 6, wherein the standard weight aggregate is sand.

9. The composition of claim 8, wherein the filler is limestone.

10. The composition of claim 7, wherein the accelerating additive is calcium chloride, the standard weight aggregate is sand, and the filler is limestone.

11. The composition of claim 6, wherein the composition consists essentially of:
   latex in an amount of about 2.4 weight percent,
   cement in an amount of about 24.4 weight percent,
   lightweight aggregate in an amount of about 41.5 weight percent,
   water in an amount of about 10.9 weight percent, standard weight aggregate in an amount of about 15.3 weight percent, and filler in an amount of about 4.9 weight percent.

12. The composition of claim 11, further consisting essentially of an effective accelerating amount of accelerating additive.

13. The composition of claim 11, wherein the standard weight aggregate is sand.

14. The composition of claim 13, wherein the filler is limestone.

15. The composition of claim 12, wherein the accelerating additive is calcium chloride, the standard weight aggregate is sand, and the filler is limestone.

16. A method for making a composition useful for fabricating lightweight roof tiles, comprising the steps of:

(a) mixing between about 9.0 and 15.0 weight % water, between about 5.0 and 35.0 weight % standard weight aggregate, between about 28.0 and 55.0 weight % lightweight aggregate, between about 0.0 and 8.0 weight % filler, between about 2.0 and 4.1 weight % latex (solids basis) in a mixer for a period of about 30 seconds in order to disperse the latex; and (b) then adding to said mixer between about 20.0 and 28.0 weight % cement and an effective accelerating amount of accelerating additive and mixing for about 90 seconds to 100 seconds to produce a homogeneous mix.

17. A method for making a composition useful for fabricating lightweight roof tiles, comprising the steps of:

(a) mixing between about 10.0 to 12.0 weight % water, between about 10.0 to 20.0 weight % standard weight aggregate, between about 35.0 to 45.0 weight % lightweight aggregate, between about 3.0 to 7.0 weight % filler, between about 2.2 to 3.0 weight % latex (solids basis) in a mixer for a period of about 30 seconds in order to disperse the latex; and (b) then adding to said mixer between about 23.0 to 26.0 weight % cement and between about 0.0 to 0.6 weight percent accelerating additive and mixing for about 90 seconds to 100 seconds to produce a homogeneous mix.

18. The method of claim 17, wherein:

the latex is about 2.4 weight percent, the cement is about 24.4 weight percent, the lightweight aggregate is about 41.5 weight percent, the water is about 10.9 weight percent, the standard weight aggregate is about 15.3 weight percent, the filler is about 4.9 weight percent, and the accelerating additive is about 0.6 weight percent.

19. The method of claim 18, wherein the standard weight aggregate is sand.

20. The method of claim 19, wherein the filler is limestone.

21. The method of claim 16, wherein the standard weight aggregate is sand and the filler is limestone.

22. The method of claim 21, further comprising the steps of:

(c) extruding mixture (b) into a roofing tile; and (d) curing the roofing tile at about 100°–120° F. and about 80–95% relative humidity for about 4 hours, then for about one additional hour with a relative humidity controller turned off.

23. The composition of claim 1, wherein the composition consists essentially of:

latex (on solids basis) in an amount of about 2.8 weight percent, cement in an amount of about 20.5 weight percent, lightweight aggregate in an amount of about 29.7 weight percent, water in an amount of about 11.8 weight percent, standard weight aggregate in an amount of about 30.7 weight percent, and filler in an amount of about 4.1 weight percent.

24. The method of claim 16, wherein the method comprises the steps of:

(a) mixing about 11.8 weight % water, about 30.7 weight % standard weight aggregate, about 29.7 weight % lightweight aggregate, about 4.1 weight % filler, about 2.8 weight % latex (solids basis) in a mixer for a period of about 30 seconds in order to disperse the latex; and (b) then adding to said mixer about 20.5 weight % cement and an effective accelerating amount of accelerating additive and mixing for about 90 seconds to 100 seconds to produce a homogeneous mix.

* * * * *

UNITED STATES PATENT AND TRADEMARK OFFICE
CERTIFICATE OF CORRECTION

PATENT NO. : 5,603,758
DATED : February 18, 1997
INVENTOR(S) : Walter A. Schreifels, Jr. et al.

It is certified that error appears in the above-indentified patent and that said Letters Patent is hereby corrected as shown below:

Column 5, line 61, delete "Glehdale" and insert --Glendale-- therefor.

Column 7, line 15, delete ".to" and insert --to-- therefor.

Table 3, Sample #1, under OVEN DRY WEIGHT (GRAMS), delete "30" and insert --830-- therefor.

Signed and Sealed this

Second Day of September, 1997

Attest:

BRUCE LEHMAN

Attesting Officer

Commissioner of Patents and Trademarks